Sept. 8, 1953

E. M. KELLY ET AL 2,651,615

CLARIFICATION APPARATUS

Filed Nov. 9, 1950

INVENTORS.
EARL M. KELLY
ARTHUR M. KIVARI
BY

ATTORNEY

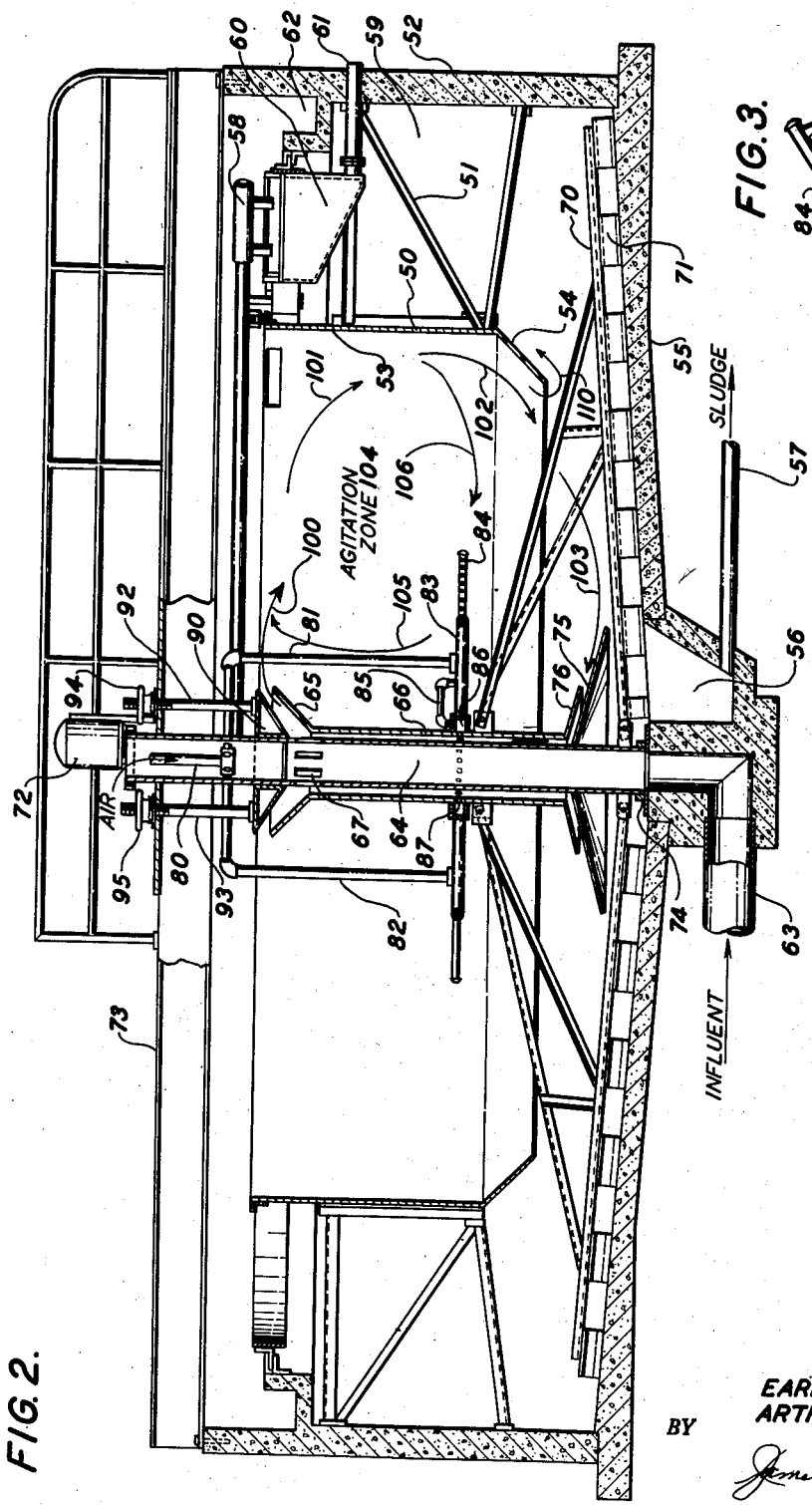

Patented Sept. 8, 1953

2,651,615

UNITED STATES PATENT OFFICE 2,651,615

CLARIFICATION APPARATUS

Earl M. Kelly, Hillsborough, and Arthur M. Kivari, Los Angeles, Calif., assignors to Process Engineers Incorporated, San Francisco, Calif., a corporation of California Application November 9, 1950, Serial No. 194,752

11 Claims. (Cl. 210—3)

This invention is concerned with clarification apparatus, particularly clarification of sewage, and provides improvements in apparatus for clarification, i. e. the flocculation and settlement of finely divided solids from liquid suspensions, such for example, as sewage and industrial wastes.

Clarification ordinarily is conducted by introducing the suspension to be clarified into a tank in which solids are settled out, the clarified liquid being removed at an overflow and the settled solids being raked to and discharged as a sludge from a pit at the bottom of the tank. Settlement may be increased by flocculation or agglomeration of the finely divided solids in the original suspension and it has been suggested heretofore that settling rate and clarifier capacity can both be increased by returning some of the settled sludge into the upper portion of the pool undergoing clarification to provide nuclei to which more finely divided solids may be attached, for example, by agglomeration or absorption.

It is also known that flocculation and settlement may be enhanced if the sludge is returned to the upper portion of the pool in which settlement occurs in an aerated mixture with the fresh feed, for example, raw sewage, flowing to clarification.

As a result of our investigations we have discovered that the rate of settlement or clarification can be increased markedly if the solids content of the aerated mixture of returned sludge and fresh feed contains a substantially higher proportion of solids than that in the incoming feed. Thus, improved results are obtained if the ratio of solids in the mixture to that in the incoming feed is 1.25 or higher. The aerated mixture of returned sludge and fresh feed preferably should contain at least about twice as much solids (by weight) as the incoming feed liquid. In one case, optimum results were obtained when the solids content of the aerated mixture of fresh feed and returned sludge was maintained in the range of say 700 to 1500 parts per million (by weight) while the solids in the incoming feed was in the range of 200 to 300 parts per million.

The improved process of our invention preferably is carried out in a relatively shallow tank having a bottom which slopes gently toward an outlet, say a sludge pit, at or near its center. A conventional raking mechanism may be provided to move sludge settling to the sloping bottom in a spiral path over the bottom to the sludge pit. A concentric annular baffle is disposed in the tank extending from slightly above the rake level to above the liquid level in the tank and is spaced inwardly from the outside wall of the tank to provide an outer annular quiescent zone in which settlement can occur without interference. The fresh feed is introduced into a central column and rises upwardly to be discharged therefrom near the liquid level at the center of the pool which is retained in the tank. This column may be in the form of an airlift, and a provision is made near the bottom of the column for admitting into it some of the sludge that is raked toward the center of the clarifier. The airlift sucks this sludge into the column and conveys it upward. The air introduced by the airlift aerates the sludge and also aerates the fresh feed, after which the aerated mixture of raw feed and returned sludge is discharged adjacent the liquid surface in that portion of the tank which is within the baffle, and which is known as the agitation zone.

To bring about further aeration and recirculation it may be desirable to introduce additional air into the pool in the agitation zone.

In the operation of the apparatus just described, the raw feed prior to introduction into the pool is mixed with aerated returned sludge, and discharged into the agitation zone near the top. It may be further aerated in the agitation zone. Some of the sludge tends to settle to the bottom of the tank in the agitation zone. Other solids are carried underneath the baffle into the outer annular settlement zone and settle out there, the sludge settling in both the agitation and settlement zone being raked back toward the sludge pit. From a point in the neighborhood of the sludge pit some of the sludge is sucked into the airlift and recirculated with the fresh feed.

As indicated above, we have discovered that this operation is markedly improved if the proportion of solids in the aerated mixture of returned sludge and fresh feed is substantially higher than the proportion of solids in the raw feed alone and we have developed several improvements in apparatus of this type to increase the proportion of solids in the returned sludge. These and other improvements in apparatus which are outlined below increase settlement rate and equipment capacity.

One of the major structural improvements which contributes to improved operation of clarifiers of the type described is a roof disposed over the sludge pit adjacent the bottom of the central column or airlift, the space underneath the edge of the roof being open to permit sludge to enter and be sucked up by the airlift action. The roof provides a quiescent zone in the neighborhood of the sludge pit from which neighborhood the sludge to be returned is withdrawn. The sludge tends to be thicker in this quiescent zone, and hence the mixture of returned sludge and fresh feed will have a higher solids content.

Preferably the roof slants outward and down from the column that it surrounds and may be a relatively flat frustrum of a cone. We have found that the accumulation of solids on a roof or guard of this type is negligible, so that there is little tendency for solids to be retained and putrify.

In a preferred form of our apparatus two "roofs" are employed. One roof, which may be frusto conical in shape, overlies the sludge pit and the other roof is disposed above it with a gap in between, through which sludge to be returned is sucked up into the airlift and, after being aerated and mixed with fresh feed, discharged into the agitation zone of the apparatus.

Preferably the upper end of the airlift is made in the form of a flared distributor which spews the aerated mixture outwardly in all directions into the agitation zone and tends to establish a smooth recirculation in the agitation zone. To the same end, the lower edge of the annular baffle which separates the agitation zone from the outer annular sedimentation zone may be provided with an inwardly directed inverted frusto conical section which tends to deflect the circulating mixture in the agitation zone inwardly toward the airlift.

The flared distributor at the top of the airlift is, in the preferred form of our apparatus, provided with an adjustable deflector, the height of which may be regulated to vary the resistance to flow through the airlift and hence the amount of sludge recirculated. In this way, the proportion of solids in the recirculated mixture may be controlled conveniently. The deflector also controls the violence with which the aerated mixture of returned sludge and fresh feed is discharged into the agitation zone. As described in detail hereinafter, the adjustment of the deflector may be made automatic by constructing it in the form of or fastening it to a float.

Although it is not essential to provide additional aerating means in the agitation zone we have found that this is desirable and we prefer to provide such means in the zone adjacent the airlift at a point above the roof. These aerators tend to induce a circulation of incompletely settled sludge in the agitation zone, which, as described and claimed in our co-pending application Serial No. 96,184, filed May 31, 1949, now Patent No. 2,568,452, further tends to increase flocculation and settlement. The aerators may take various forms such as simple perforated pipes or porous ceramic tubes or diffusers. Preferably, however, the aerators are outwardly extending and preferably radial pipes provided with a plurality of nozzles extending sidewise from the pipe and projecting a plurality of air jets more or less horizontally into the pool.

These and other aspects of our invention will be understood more thoroughly in the light of the following detailed description and the accompanying drawings, in which:

Fig. 2 is an elevation, partly in section, through still another form of the clarifier of our invention; and Fig. 3 is a fragmentary plan view illustrating the arrangement of air nozzles employed in the aeration apparatus in the agitation zone or compartment of the apparatus of Fig. 2.

Figure 1:
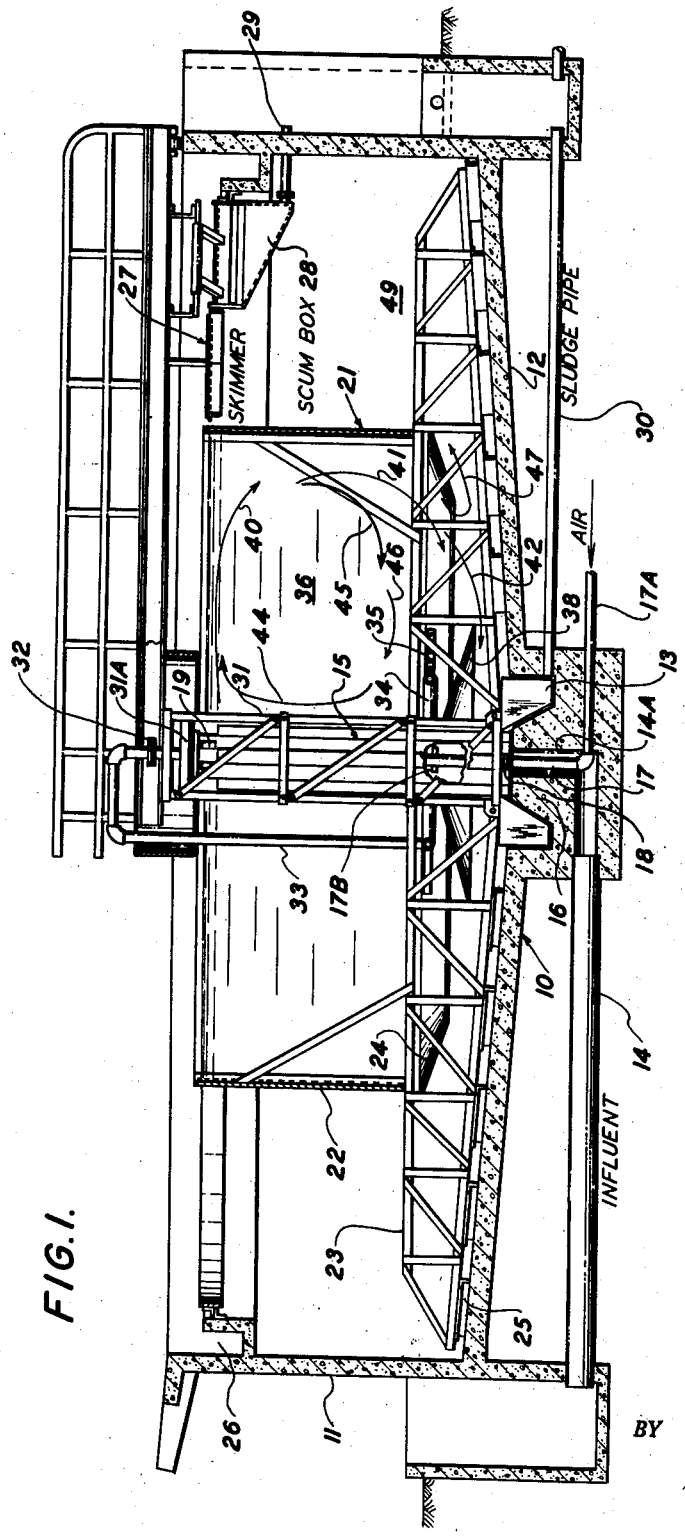
Fig. 1 is an elevation, partly in section, through one form of the clarifier of our invention.

Referring to Fig. 1, the apparatus comprises a round concrete tank 10 having a vertical outside wall 11 and an inverted frusto conical bottom 12. This slopes gently to an annular sludge pit 13 at the center of the apparatus. Influent to be clarified, say raw sewage, is introduced underneath the apparatus through a pipe 14 and a riser 14A, from which it flows into a stationary vertical central column 15 that rests on a central pier 16 which defines the inside wall of the annular sludge pit. The central column is provided with a plurality of inlet ports 18 immediately above the pier. These ports open into the tank adjacent the sludge pit and permit entry of sludge to be recirculated up the central column. The column terminates near the top of the tank and is provided with a series of outlet ports 19 through which an aerated mixture of returned sludge and fresh feed is thrown out into the pool retained in the tank.

The central column performs the triple function of mixing the incoming feed and the returned sludge, aerating the mixture, and airlifting the mixture to and through the discharge ports at the top of the column. Air is introduced into the column through a vertical pipe 17 that runs up through it, and which is fed with compressed air at the bottom through a horizontal inlet pipe 17A. At a point in the column above the sludge entry ports, the pipe carries a plurality of air jets 17B which discharge into the column and bring about the triple action described above.

An annular baffle 21 is disposed in the tank about midway between the central column and the outside wall. It has an upright portion 22, which rides on a conventional rake mechanism 23 that rotates around a central vertical axis. It has a lower inwardly sloping frusto conical section 24 which is fastened to the vertical section at its upper edge. The rake structure is provided with rakes 25 which move sludge settled into the bottom of the tank in spiral paths downwardly over the tank bottom into the sludge pit. Sludge settling into the bottom of the sludge pit is withdrawn through a sludge pipe 30.

Clarified effluent from the operation overflows at the top of the apparatus into an annular launder 26. A conventional skimmer mechanism 27 for the removal of froth, scum, etc. is provided at the top of the tank and discharges into a scum box 28 from which the scum flows out through a pipe 29.

The rake mechanism is fastened to a rotatable cage 31 which is disposed around the central or airlift column. The cage is supported on a bearing 31A at the top of the column and is rotated by conventional means (not shown).

The air pipe 17 which supplies the air for the airlift extends upwardly through the top of the central column thence through a rotatable joint 32. This is connected to an air pipe 33 that supplies an air manifold 34 carried by the rake structure. Projecting from the manifold are radial air diffusers 35 through which air is discharged into the agitation zone 36 extending from the annular baffle to the central column.

A frusto conical roof or guard 38 is fastened to the cage and overlies the sludge pit, there being a gap below the roof, so that sludge may be removed by the rakes into the region of the pit.

In the operation of the apparatus of Fig. 1, the influent, say raw sewage, enters the bottom of the central column, in which an airlift action is maintained by air introduced through the pipe 17. Sludge is sucked into the ports 18 at the bottom of the column and the mixture of air, fresh feed and returned sludge is discharged at the top of the column into the agitation zone. Recirculation occurs in this zone as indicated by the arrows 40, 41, 42. A secondary recirculation as indicated by the arrows 44, 45, 46 also occurs in the zone, this being induced by the air diffusers which are disposed around the central column immediately above the roof or guard. Some of the material from the agitation zone escapes underneath the annular baffle, as indicated by the arrow 47, into the outer annular or settlement zone 49, where the bulk of sedimentation occurs. Clarified liquid rises in the sedimentation zone countercurrent to the settling solids and is removed through the annular overflow launder 26.

The frusto conical roof or guard which overlies the sludge pit provides a quiescent zone in which the sludge may thicken without interference from the agitation which takes place in the region overlying the pit. The presence of the roof permits the production of a thicker sludge which may be sucked into the airlift through the ports 18 and returned, thereby maintaining in the airlift a higher proportion of solids than is present in the influent.

The inverted frusto conical portion of the annular baffle serves a dual purpose, in that it tends to deflect the circulation in the agitation zone toward the central column and thereby furthers recirculation as opposed to direct by-passing of liquid and solids underneath the baffle into the sedimentation zone, and also tends to streamline the recirculation.

In the operation of the apparatus of Fig. 1, the amount of air supplied to the airlift may be varied to change the proportion of returned sludge sucked in through the lower ports, thereby controlling the percentage of solids in the mixture of fresh feed and returned sludge that is recirculated through the aeration zone.

The apparatus of Fig. 2 is in general similar to that of Fig. 1. However, its annular baffle 50, instead of being supported on the rake mechanism as in the apparatus of Fig. 1 is carried by a truss work 51 from the vertical outside wall 52 of the tank. As in the case of the apparatus of Fig. 1, the annular baffle has an upper vertical portion 53 and a lower inverted frusto conical section 54 which slopes inwardly toward the center of the clarifier.

The tank of Fig. 2 has an inverted frusto conical bottom 55 which slopes inwardly toward a sludge pit 56 from which sludge is withdrawn through a pipe 57. A conventional skimming mechanism 58 is disposed in the outer annular or sedimentation zone 59 near the top and discharges into a scum box 60 from which the scum is removed through an outwardly extending pipe 61. A peripheral launder 62 extends around the top of the outside tank wall on the inside. Clarified effluent overflows from a pool retained in the tank into this launder.

Influent, say raw sewage, is introduced into the apparatus through a lower pipe 63 which terminates in a rotatable vertical hollow column 64. This extends upwardly into the tank and through a flared inverted frusto conical distributor 65. This distributor is mounted on the top of a concentric pipe 66 which surrounds the central column and rotates therewith. The central column is provided with ports 67 at its top through which the fresh feed is forced out into the distributor.

The apparatus is provided with a conventional rake structure 70 having rakes 71. The rake structure is fastened to the central column and rotates therewith, moving settled sludge from substantially the entire bottom into the sludge pit. The rake structure and the central column and its attachments are rotated by means of a motor 72 mounted on a superstructure 73 that extends across the top of the tank. The central column and its attachments are supported from above but to minimize sway a guide bearing 74 is placed at the bottom of the column.

Immediately overlying the sludge pit, above the rake level and supported on the central column is a frusto conical guard or roof 75. A smaller guard or roof 76 is disposed immediately above in spaced relationship. The upper roof or guard is fastened to the outer pipe 66 which surrounds the central column and rotates therewith.

Air is admitted through a vertical pipe 80 at the top of the apparatus and thence through a swivel joint into a plurality of pipes 81, 82 which extend downwardly to an air manifold 83. This carries a series of horizontal radial air pipes 84. The air pipes 84 carry a set of horizontal nozzles 84A which discharge air horizontally transverse to the major axis of the pipes (see Fig. 3). These air nozzles bring about excellent dispersion of the air and are less susceptible to plugging than conventional diffusers of porous ceramic or the like.

Air from the manifold is also supplied through a pipe 85 into a bustle pipe 86 which has a series of apertures 87 that communicate with the annular space between the outer pipe 66 and the inner pipe of the central column, and cause an air-lifting action in this space.

An inverted frusto conical deflector 90 is adapted to ride up and down on the central column and is journalled around it immediately above the flared distributor. The preferred form of deflector, as shown, is hollow, so that it constitutes a float, which will rise and fall with the liquid level of the pool if it is left free, being guided by the central column around which it is journalled. When the flow through the apparatus is low, the pool level will drop, constricting the opening between the deflector and the distributor, thus tending to hold the velocity of flow through the distributor more or less constant. However, if desired, the position of this deflector with respect to the distributor may be fixed at any desired position by means of adjusting screws 92, 93 which pass through the superstructure of the apparatus and are threaded into nuts 94, 95.

The operation of the apparatus of Fig. 2 is as follows: Fresh feed, say raw sewage, is introduced into the central column at the bottom through the pipe 63 and rises in the central column, escaping through the ports 67 within the distributor. At the same time recirculated sludge passes in between the two frusto conical roofs or guards 75, 76, and rises in the annular space around the central column, being buoyed up and mixed with air introduced through the bustle pipe. In the distributor this aerated returned sludge is mixed with fresh feed and the resulting aerated mixture is immediately discharged from the flared distributor into the top of the pool at the center.

A primary recirculation indicated by the arrows 100, 101, 102, 103, is set up in the agitation zone 104 by means of the airlift. A secondary recirculation indicated by the arrows 105, 106, is set up in the agitation zone closer to the central column by the air nozzles 84A.

Sludge which settles to the bottom of the clarifier is raked into the sludge pit, where it is protected by the guard or roof 75. Other and less dense sludge is drawn into the space between the two roofs or guards and thence up in the annular space around the central column.

Some of the contents of the agitation zone continually passes under the annular baffle, as indicated by the arrow 110, into the outer or sedimentation zone from which a clarified liquid overflows to the launder 62.

The amount of recirculated sludge, as well as its density, may be regulated by raising or lowering the deflector cone which overlies the conical distributor at the top of the apparatus.

In the operation of the apparatus of either Fig. 1 or Fig. 2 the aim is to recirculate a relatively dense sludge and to permit such a sludge to be formed in the lower portion of the apparatus. In the apparatus of Fig. 2 the arrangement is such that the density of the sludge to be recirculated may be less, but the positive control apparatus in the form of the adjustable deflector permits the same results to be obtained with the apparatus of Fig. 2 as of Fig. 1. At the same time the apparatus of Fig. 2 in many instances may permit a more dense sludge to be removed through the sludge pit from the apparatus.

We claim:

1. In clarification apparatus comprising a tank for containing a pool of liquid to be clarified and in which sludge settles to the bottom, a sludge outlet in the bottom of the tank, and means for moving the sludge along the bottom of the tank to the outlet, the combination which comprises an airlift in the tank projecting upward near the outlet, means in the tank for admitting sludge into the airlift from near the outlet, means for introducing incoming feed to be clarified into the air-lifted sludge prior to its discharge into the tank, means for discharging the resulting aerated sludge and feed into an upper portion of the tank near the upper end of the airlift, a roof disposed around the airlift just above the point at which the sludge is introduced into the airlift to prevent the material being drawn into the airlift from becoming diluted, and means for aerating the tank contents outside the airlift disposed in the tank above the roof.

2. Apparatus according to claim 1 in which the means for aerating the tank contents comprises a plurality of pipes extending out from the airlift, each pipe being provided with a plurality of nozzles.

3. Apparatus according to claim 1 in which the means for aerating the tank contents comprises a plurality of pipes extending out from the airlift, each pipe being provided with a plurality of nozzles discharging transverse to the major axis of the pipe in a relatively horizontal direction.

4. In clarification apparatus comprising a tank for containing a pool of liquid to be clarified and in which sludge settles to the bottom, a sludge outlet in the bottom of the tank, and means for moving the sludge along the bottom of the tank to the outlet, the combination which comprises an airlift in the tank projecting upward from near the outlet, means in the tank for admitting sludge into the airlift from near the outlet, means for introducing incoming feed to be clarified into the air-lifted sludge prior to its discharge into the tank, means for discharging the resulting aerated sludge and feed into an upper portion of the tank near the upper end of the airlift, and two roofs disposed around the airlift and spaced from each other, one just above the point at which the sludge is introduced into the airlift, and one just below the point at which the sludge is introduced into the airlift and above the sludge outlet.

5. In clarification apparatus comprising a tank for containing a pool of liquid to be clarified and in which sludge settles to the bottom, a sludge outlet in the bottom of the tank near the center thereof, raking means for moving the sludge along the bottom of the tank to the outlet, and an annular baffle in the tank spaced from the center and its outside wall and extending from a level above the raking means to a level above the surface of the pool of liquid, the combination which comprises an airlift in the tank projecting upward from near the outlet, means in the tank for admitting sludge into the airlift from near the outlet, means for introducing incoming feed to be clarified into the air-lifted sludge prior to its discharge into the tank, means for discharging the resulting aerated sludge and the feed into an upper portion of the tank near the upper end of the airlift, an annular roof disposed around the airlift just above the point at which the sludge is introduced into the airlift to prevent the material being drawn into the airlift from becoming diluted, and an annular extension of the baffle extending inwardly at its lower edge toward the center of the tank.

6. In clarification apparatus comprising a tank for containing a pool of liquid to be clarified and in which sludge settles to the bottom, a sludge outlet in the bottom of the tank, and means for moving the sludge along the bottom of the tank to the outlet, the combination which comprises an airlift in the tank projecting upward from near the outlet, means in the tank for admitting sludge into the airlift from near the outlet, means for introducing incoming feed to be clarified into the air-lifted sludge prior to its discharge into the tank, an outwardly flaring distributor connected to the top of the airlift for discharging the resulting aerated sludge and the feed into an upper portion of the tank near the top of the airlift, and a roof disposed around the airlift just above the point at which the sludge is introduced into the airlift to prevent the material being drawn into the airlift from becoming diluted.

7. In clarification apparatus comprising a tank for containing a pool of liquid to be clarified and in which sludge settles to the bottom, a sludge outlet in the bottom of the tank near the center thereof, raking means for moving the sludge along the bottom of the tank to the outlet, and an annular baffle in the tank between its center and the outside wall and open at the level of the raking means but extending upward to a level above the surface of the pool, the combination which comprises an airlift in the tank projecting upward from near the outlet, means for admitting sludge into the airlift from near the outlet, means for introducing incoming feed to be clarified into the air-lifted sludge prior to its discharge into the tank, an outwardly flaring distributor connected to the top of the airlift for discharging the resulting aerated sludge and the feed into an upper portion of the tank near the top of the airlift, an annular roof disposed around the airlift just above the point at which the sludge is introduced into the airlift to prevent material drawn into the airlift from becoming diluted, and an annular extension of the baffle extending inwardly toward the center around the bottom of the baffle.

8. In clarification apparatus comprising a tank for containing a pool of liquid to be clarified and in which sludge settles to the bottom, a sludge outlet in the bottom of the tank, and means for moving the sludge along the bottom of the tank to the outlet, the combination which comprises an airlift in the tank projecting upward from near the outlet, means in the tank for admitting sludge into the airlift from near the outlet, means for introducing incoming feed to be clarified into the air-lifted sludge prior to its discharge into the tank, an outwardly flaring distributor connected to the top of the airlift for discharging the resulting aerated sludge and the feed outwardly into an upper portion of the tank near the top of the airlift, a vertically adjustable deflector above the distributor for varying the flow of the sludge and feed therethrough, and a roof disposed around the airlift just above the point at which the sludge is introduced into the airlift.

9. Apparatus according to claim 8 in which the deflector is buoyant and rises and falls with the level of the pool of liquid in the apparatus.

10. Apparatus according to claim 8 in which the deflector is of inverted frusto-conical form.

11. Apparatus according to claim 8 in which the deflector is of inverted frusto-conical form and buoyant and rises and falls with the level of the pool of liquid in the apparatus.

EARL M. KELLY.
ARTHUR M. KIVARI.

References Cited in the file of this patent

UNITED STATES PATENTS

| Number | Name | Date |
|---|---|---|
| 2,076,529 | Durdin 3d | Apr. 13, 1937 |
| 2,077,907 | Streander | Apr. 20, 1937 |
| 2,110,721 | Fischer | Mar. 8, 1938 |
| 2,129,267 | Fischer | Sept. 6, 1938 |
| 2,249,049 | Sayers et al. | July 15, 1941 |
| 2,370,356 | Kamp et al. | Feb. 27, 1945 |
| 2,477,459 | Kelly | July 26, 1949 |
| 2,568,452 | Kelly et al. | Sept. 18, 1951 |